United States Patent

[11] 3,593,238

| [72] | Inventor | Yoichi Mori |
| | | Yokohama, Japan |
| [21] | Appl. No. | 872,313 |
| [22] | Filed | Oct. 29, 1969 |
| [45] | Patented | July 13, 1971 |
| [73] | Assignee | Nissan Motor Company, Limited |
| | | Yokohama, Japan |
| [32] | Priority | Oct. 30, 1968 |
| [33] | | Japan |
| [31] | | 43-78,833 |

[54] THROTTLE CONTROL UNIT FOR CONTROL SYSTEM OF AUTOMOTIVE AUTOMATIC TRANSMISSION
3 Claims, 10 Drawing Figs.

[52] U.S. Cl. .................................................. 335/229,
 335/272, 200/61.91, 251/135
[51] Int. Cl. .................................................. H01f 7/08
[50] Field of Search .................................................. 251/135,
 133, 65, 129; 335/227, 222, 229, 272, 219;
 200/61.89, 61.9, 61.91

[56] References Cited
UNITED STATES PATENTS

| 2,354,902 | 8/1944 | Wolferz | 335/222 X |
| 2,589,188 | 3/1952 | De Craene et al. | 251/65 |
| 3,323,548 | 6/1967 | Ludwig | 251/233 X |

Primary Examiner—G. Harris
Attorney—John Lezdey

ABSTRACT: A device for controlling the throttle valve in an automotive engine having a rotary permanent magnet carried on the shaft of the throttle valve, a stationary electric magnet producing a longitudinal magnetic field and connected by a pin with an accelerator pedal, an electromagnet having a coil for producing a lateral magnetic field, a support for connecting the permanent magnet with the electromagnet, another magnet disposed opposite to the permanent magnet and rotatably engaged with the shaft. This device serves to open and close the throttle valve in the engine in response to an electric signal.

THROTTLE CONTROL UNIT FOR CONTROL SYSTEM OF AUTOMOTIVE AUTOMATIC TRANSMISSION

This invention relates to a device for controlling the throttle valve in an automotive engine, and more particularly to a control device adapted to control the engine speed to equalize it with the driven shaft speed during the speed shifting in an automatic transmission.

The conventional control device for equalizing the engine speed with the driven shaft speed in the automatic transmission has adopted an electric solenoid which moves in a straight line and operates to merely open or close the throttle valve, and even if an electric motor is used, its reaction is transmitted through the accelerator pedal to the vehicle driver whose foot therefore tends to be irresponsive to the pressure from the pedal.

This invention eliminates the aforementioned disadvantage of the conventional throttle valve control and has an object of providing a new and improved device for controlling the throttle valve. The device according to this invention has a rotary permanent magnet carried directly on the shaft of the throttle valve and having a magnetic field perpendicular to the shaft, an electromagnet driven by the accelerator pedal producing a magnetic field to operate the shaft and accordingly the throttle valve. Thus, this control device is capable of controlling the opening and closing of the throttle control in compact and less expensive construction.

The features and advantages of the present invention will become apparent from the following description used in conjunction with the accompanying drawings, in which.

Figure 1:
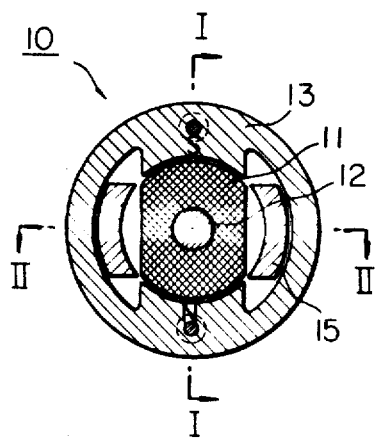
FIG. 1 is a side sectional view of a device in accordance with the present invention.
Figure 2:
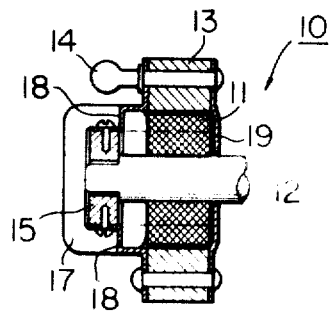
FIG. 2 is a longitudinal sectional view of the device taken along the line I-I of FIG. 1.
Figure 3:
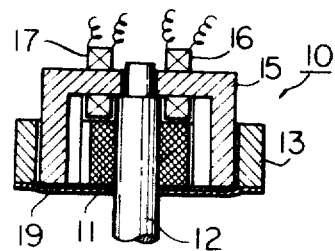
FIG. 3 is a lateral sectional view of the device taken along the line II-II of FIG. 1.

In FIGS. 1 to 3, the device 10 comprises a rotary permanent magnet 11 carried on a shaft 12 of the throttle valve (not shown), a stationary permanent magnet 13 for producing a longitudinal magnetic field and connected by a pin 14 with the accelerator pedal (not shown) through a linkage (not shown), an electromagnet 15 having a plurality of coils 16 and 17 for producing a lateral magnetic field, a support 18 for connecting said permanent magnet 13 with said electromagnet 15, another support 19 disposed opposite to the permanent magnet 13 and rotatably engaged with said shaft 12.

In operation of the thus constructed device, when an electric current is absent in the coils 16 and 17, the permanent magnet 11 attracts the permanent magnet 13 so that they are disposed in the positions shown in FIG. 1. Since the permanent magnet 13 is connected by the pin 14 with an accelerator pedal, (not shown) if the accelerator pedal is depressed, the motion of the permanent magnet 13 is carried to the permanent magnet 11 so that the permanent magnet 11 rotates around the shaft 12 of the throttle valve, which is consequently opened or closed.

When the coil 16 or 17 is energized by the electric current to cause the electromagnet 15 to be magnetized, the magnetic force of the electromagnet 15 is combined with that of the permanent magnet 13 with the result that the plane of the magnetic field is deviated from its normal position and cause the magnet 11 to rotate to a deviated position as a result of this attraction. Accordingly, the shaft 12 of the throttle valve is actuated to cause the throttle valve to be opened or closed. In this instance, the coils 16 and 17 are so disposed as to produce magnetic fields opposite to each other so that, if the current flows in one coil, the throttle valve is opened and, if the current flows in the other coil, the throttle valve is closed.

If desired, the coils 16 and 17 may be so arranged as to produce magnetic fields in the same direction and permit the current to flow alternately in the coils, thereby to open or close the throttle valve.

Figure 4:
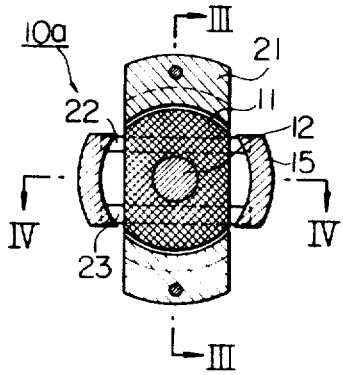
FIG. 4 is a side sectional view of an alternative example of the device shown in FIGS. 1 to 3.
Figure 5:
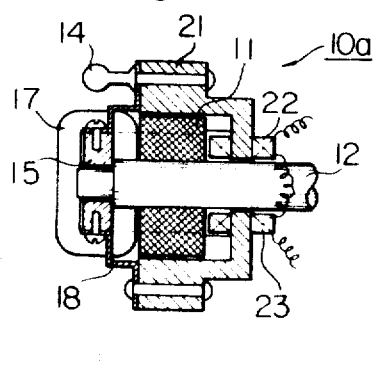
FIG. 5 is a longitudinal sectional view of the device taken along the line III-III of FIG. 4.
Figure 6:
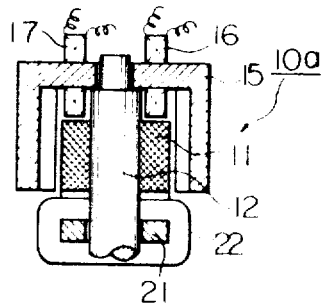
FIG. 6 is a lateral sectional view of the device taken along the line IV-IV of FIG. 4.
Figure 7:
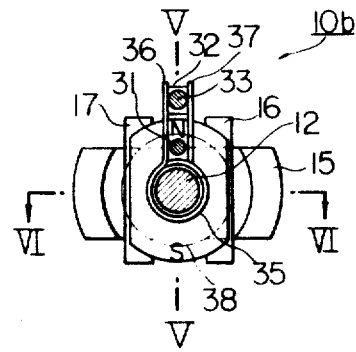
FIG. 7 is a side sectional view of another alternative example of the device of this invention.
Figure 8:
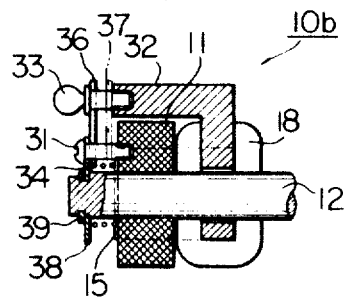
FIG. 8 is a longitudinal sectional view of the device along the line V-V of FIG. 7.
Figure 9:
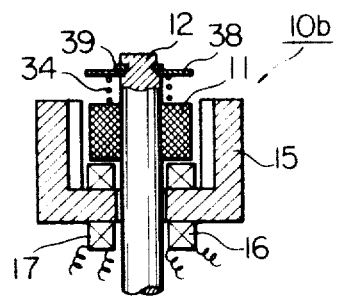
FIG. 9 is a lateral sectional view of the device taken along the line VI-VI of FIG. 7.

Referring now to FIGS. 4 to 6, which show a second embodiment of the device shown in FIG. 1 to 3 wherein an electromagnet is used in lieu of the permanent magnet 13 in the first embodiment and wherein the like parts and components are designated by the same reference numerals of those shown in FIGS. 1 to 3. This modified device which is designated generally at 10a comprises, similarly to the first embodiment, a rotary permanent magnet 11 carried on a shaft 12 of the throttle valve (not shown), an electromagnet 15 having coils 16 and 17 for producing a lateral magnetic field, a support 18 for connecting the magnet 15, and another support (not shown) disposed on the opposite side of the permanent magnet 13 and rotatably engaged with the shaft 12. The device as shown also includes an electromagnet 21 for producing a longitudinal magnetic field. This electromagnet 21 is connected by a pin 14 with an accelerator pedal (not shown) and has a plurality of coils 22 and 23 for energizing the electromagnet.

In operation of the thus constructed device, when the coils 22 and 23 are energized by an electric current to cause the electromagnet 21 to be magnetized, the throttle valve is moved in response to the movement of the accelerator pedal and, when the coils 22 and 23 are deenergized with the throttle valve opened or closed with the accelerator pedal not moved, the permanent magnet 11 is moved only by the magnetic force of the electromagnet 15. In this regard, the magnetic field is built up in the horizontal direction in FIG. 4, and accordingly, the open area at the throttle can be increased as compared with the conventional device. To return the throttle valve to its previous angular position, the electromagnet 15 is deenergized and instead the electromagnet 21 is energized. If, in this instance, the timing of the energization of the electromagnets is delayed, the reset time will accordingly be delayed. Similarly to the first embodiment, the coils 22 and 23 may be so arranged as to produce magnetic fields in the same direction and permit the current to flow alternately in the coils, if desired.

A third embodiment of the device according to this invention is illustrated in FIGS. 7 to 10, wherein a spring is used for resetting the throttle valve. This further modified device 10b invariably comprises a rotary permanent magnet 11 carried on the shaft 12 of the throttle valve (not shown) and having a pin 31, and an electromagnet 15 having coils 16 and 17 for producing a lateral magnetic field and also having a branch 32 attached to a pin 33. The device further comprises a return spring 34 having a coil portion 35 and a straight portions 36 and 37 at both ends thereof, said coil portion 35 of the return spring 34 being wound around the shaft 12 of the throttle valve, said straight portions 36 and 37 of the return spring 34 being so disposed as to attach from both sides of the pins 31 and 32, respectively. A disc 38 is attached to the end of the shaft 12 of the throttle valve by a snapring 39 to prevent the spring 34 from removing therefrom.

Figure 10:
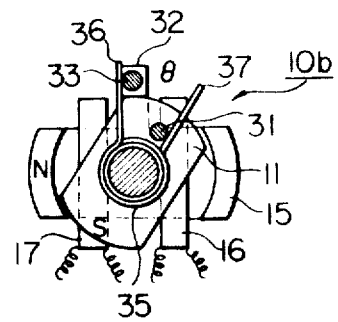
FIG. 10 is a side sectional view similar to FIG. 7 but showing the condition of the device in which the coil of the electromagnet is energized so that the permanent magnet is inclined.

In operation of the thus constructed device, since the pins 31 and 33 are disposed between the straight portions 36 and 37 of the spring 35 in the same direction with respect to the shaft 12, when the electromagnet 15 is not energized, the throttle valve is moved in response to the movement of the accelerator pedal. When the coils 16 and 17 are energized to open or close the throttle valve for shifting the speed reduction ratio in the transmission the magnetic field is produced as shown in FIG. 10 so that the permanent magnet 11 is rotated at an angle of $\theta$ to open or close the throttle valve. Thereupon, the spring 34 expands at its straight portion 37 by means of the pin 31 as shown in FIG. 10. When the electromagnet 15 is magnetized in the opposite direction causing the throttle valve to be moved in the opposite direction, the pin 31 is pushed back the action of the spring 35 as shown in FIG. 10.

It will now be appreciated from the foregoing description, that the automatic transmission of an automotive vehicle using the throttle control device according to this invention is capable of controlling the engine speed in a far broader range than in the case of the conventional transmissions. The device of this invention is, it may be mentioned, also advantageous in compactizing the construction of an automatic transmission.

I claim:

1. A device for controlling the throttle valve for an automotive engine comprising a rotary permanent magnet connected to the shaft of the throttle valve, a stationary magnet connected to a pin of an accelerator pedal linkage for producing a longitudinal magnetic field, an electromagnet having a plurality of coils for producing a lateral magnetic field, a support connecting said stationary magnet to said electromagnet, and another support disposed on the opposite side of said stationary magnet and rotatably engaged with said shaft.

2. A device according to claim 1, further comprising an electromagnet for producing a longitudinal magnetic field and connected to a pin of an accelerator pedal linkage and having a plurality of coils for energizing said electromagnet.

3. A device for controlling the throttle valve for an automotive engine comprising a rotary permanent magnet connected to the shaft of the throttle valve and having a pin, an electromagnet having a plurality of coils for producing a lateral magnetic field and also having a branch attached to a pin, a return spring having a coil portion and straight portions at both ends thereof, the coil portion of the return spring being wound around the shaft of the throttle valve, the straight portions of said return spring being so disposed as to attach from both sides of the pins, respectively, and a disc attached to the end of said shaft of the throttle valve by a snapring to prevent the spring from removing therefrom.